United States Patent
Shibata

(10) Patent No.: US 9,300,175 B2
(45) Date of Patent: Mar. 29, 2016

(54) ROTOR AND MOTOR INCLUDING ROTOR

(71) Applicant: JTEKT CORPORATION, Osaka-shi, Osaka (JP)

(72) Inventor: Yoshiyuki Shibata, Toyota (JP)

(73) Assignee: JTEKT CORPORATION, Osaka (JP)

(*) Notice: Subject to any disclaimer, the term of this patent is extended or adjusted under 35 U.S.C. 154(b) by 232 days.

(21) Appl. No.: 13/894,768

(22) Filed: May 15, 2013

(65) Prior Publication Data

US 2013/0313936 A1 Nov. 28, 2013

(30) Foreign Application Priority Data

May 25, 2012 (JP) ................................. 2012-120143

(51) Int. Cl.
*H02K 1/27* (2006.01)
*H02K 21/14* (2006.01)
*H02K 21/16* (2006.01)

(52) U.S. Cl.
CPC ................. *H02K 1/27* (2013.01); *H02K 1/274* (2013.01); *H02K 1/276* (2013.01); *H02K 1/2706* (2013.01); *H02K 1/2746* (2013.01); *H02K 1/2766* (2013.01); *H02K 1/2773* (2013.01); *H02K 21/14* (2013.01); *H02K 21/16* (2013.01); *H02K 2213/03* (2013.01)

(58) Field of Classification Search
CPC ....... H02K 1/27; H02K 1/2766; H02K 1/276; H02K 21/14; H02K 21/15; H02K 1/2746; H02K 1/274; H02K 1/2706; H02K 1/2773; H02K 1/272; H02K 21/16
USPC ............................ 310/156.43, 156.39, 156.38
See application file for complete search history.

(56) References Cited

U.S. PATENT DOCUMENTS

| | | | | | |
|---|---|---|---|---|---|
| 3,319,094 | A | * | 5/1967 | Snodgrass | 310/68 R |
| 5,159,220 | A | * | 10/1992 | Kliman | 310/156.56 |
| 6,225,724 | B1 | * | 5/2001 | Toide et al. | 310/156.53 |
| 6,323,572 | B1 | * | 11/2001 | Kinoshita | 310/156.07 |
| 6,441,524 | B2 | * | 8/2002 | Kaneko et al. | 310/156.45 |
| 2003/0011265 | A1 | * | 1/2003 | Hattori et al. | 310/156.38 |

(Continued)

FOREIGN PATENT DOCUMENTS

| | | |
|---|---|---|
| DE | 4240995 A1 * | 6/1994 |
| DE | 101 44 585 A1 | 4/2003 |

(Continued)

OTHER PUBLICATIONS

Taubitz Bernd; Kramer Claus; Verhagen, Armin-Maria, Permanent Magnet Rotor for Synchronous Motor, Jun. 6, 1994, Bosch GMBH Robert, DE4240995.*

(Continued)

*Primary Examiner* — Terrance Kenerly
*Assistant Examiner* — Alexander Singh
(74) *Attorney, Agent, or Firm* — Oliff PLC

(57) ABSTRACT

A rotor includes: a rotor core fixed to a rotating shaft so as to be rotatable together with the rotating shaft; and a plurality of permanent magnets embedded and fixed in the rotor core. Each permanent magnet is formed of a pair of magnet pieces having a pair of magnetic pole-facing portions radially extending and magnetized so that poles of the same polarity face each other in a circumferential direction. The pair of the magnetic pole-facing portions is formed so that the length of each magnetic pole-facing portion in a magnetization direction is greater in a radially outer portion than in a radially inner portion.

7 Claims, 5 Drawing Sheets

(56) References Cited

U.S. PATENT DOCUMENTS

| | | |
|---|---|---|
| 2007/0103024 A1 | 5/2007 | Nakayama et al. |
| 2009/0236923 A1* | 9/2009 | Sakai et al. .............. 310/156.43 |
| 2009/0322175 A1* | 12/2009 | Kori et al. ................ 310/156.41 |
| 2011/0148246 A1 | 6/2011 | Mizutani et al. |

FOREIGN PATENT DOCUMENTS

| | | |
|---|---|---|
| EP | 2 339 719 A2 | 6/2011 |
| JP | A-2011-214086 | 10/2011 |
| JP | A-2012-23804 | 2/2012 |
| KR | 2000-0029130 A | 5/2000 |
| WO | WO 2013/103118 A1 | 7/2013 |

OTHER PUBLICATIONS

Feb. 19, 2014 Extended European Search Report issued in European Patent Application No. 13168175.1.

* cited by examiner

ROTOR AND MOTOR INCLUDING ROTOR

INCORPORATION BY REFERENCE/RELATED APPLICATION

This application claims priority to Japanese Patent Application No. 2012-120143 filed on May 25, 2012 the disclosure of which, including the specification, drawings and abstract, is incorporated herein by reference in its entirety.

BACKGROUND OF THE INVENTION

1. Field of the Invention

The invention relates to a rotor and a motor including the rotor.

2. Discussion of Background

There are conventional motors that include a so-called embedded magnet-type rotor in which permanent magnets are embedded and fixed in a rotor core. In a motor including the embedded magnet type rotor, reluctance torque is produced in addition to magnet torque produced by the permanent magnets. Therefore, this motor has an advantage of being able to produce higher torque than a motor that includes a so-called surface magnet type rotor in which permanent magnets are fixed to a surface of a rotor core.

There is known an embedded magnet type rotor that uses, for example, V-shaped permanent magnets that protrude toward a rotating shaft-side (e.g., Japanese Patent Application Publication No. 2011-214086 (JP 2011-214086 A)). In the rotor described in JP 2011-214086 A, the surface area of the permanent magnets can be made large, as compared to a rotor in which flat plate-shaped permanent magnets are disposed to be orthogonal to radial directions (e.g., US2011/0148246 A1). Therefore, in the rotor described in JP 2011-214086 A, it is possible to secure a sufficient number of magnetic fluxes even if permanent magnets whose maximum energy product is small are used.

If permanent magnets of a rotor are subjected to a strong external magnetic field whose direction is opposite to the magnetization direction of the permanent magnets of the rotor, for example, in the case where a coil of a stator is supplied with overcurrent, there is a possibility that a part of the permanent magnets may be magnetized in the opposite direction and demagnetization (irreversible demagnetization) may occur. In the rotor including V-shaped permanent magnets as in JP 2011-214086 A, two circumferential end portions of each permanent magnet are located more radially outward than its circumferential center portion. Therefore, there is a problem that the two circumferential end portions (radially outer portions) of each permanent magnet are likely to be demagnetized.

This problem is not limited to the rotors including the V-shaped permanent magnets, and may similarly occur in any rotor as long as the permanent magnets have magnetic pole-facing portions that radially extend. For example, the problem may occur in a rotor including U-shaped permanent magnets, or a rotor including permanent magnets each of which is formed of a pair of permanent magnet pieces arranged in a V shape (e.g., Japanese Patent Application Publication No. 2012-23804 (JP 2012-23804 A)).

SUMMARY OF THE INVENTION

The invention provides a rotor in which demagnetization of permanent magnets is suppressed, and a motor including the rotor.

According to a feature of an example of the invention, there is provided a rotor that includes a rotor core fixed to a rotating shaft so as to be rotatable together with the rotating shaft, and a plurality of permanent magnets embedded and fixed in the rotor core, wherein each of the permanent magnets has a pair of magnetic pole-facing portions radially extending and magnetized so that poles of the same polarity face each other in a circumferential direction, and wherein magnetic resistance of each of the pair of the magnetic pole-facing portions in a magnetization direction is greater in a radially outer portion than in a radially inner portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
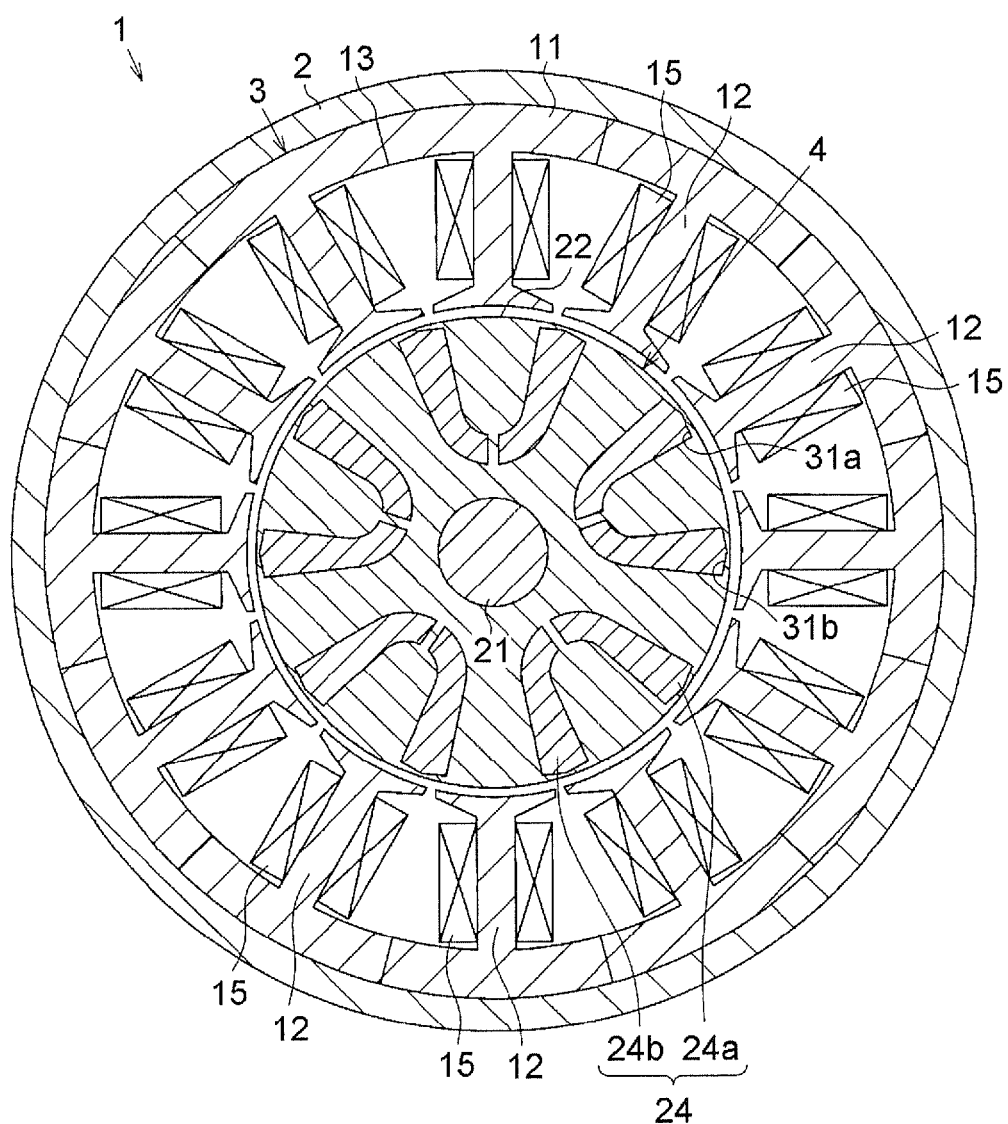
FIG. 1 is a sectional view of a motor in accordance with a first embodiment of the invention.

A first embodiment of the invention will be described with reference to the drawings. A motor (electric motor) 1 shown in FIG. 1 is mounted, for example, in a vehicle, and is used as a drive source for, for example, an electric power steering device that assists steering operation, or an electric pump device that generates hydraulic pressure. The motor 1 includes a stator 3 housed in a cylindrical case 2, and a rotor 4 that is rotatably supported at a position radially inside the stator 3.

The stator 3 includes a stator core 13 formed by a cylinder portion 11 that has a cylindrical shape and that is fixed to an inner periphery of the case 2 and a plurality of teeth 12 (twelve teeth in this embodiment) that extend radially inward from the cylinder portion 11. On the teeth 12, a plurality of coils 15 (twelve coils in this embodiment) are wound.

The rotor 4 includes a rotating shaft 21 and a cylindrical rotor core 22 that is fixed to the rotating shaft 21 so as to be rotatable together with the rotating shaft 21. In the rotor core 22, a plurality of permanent magnets 24 (five permanent magnets), each of which is formed of a pair of magnet pieces 24a and 24b, is embedded and fixed in the rotor core 22. That is, the rotor 4 of this embodiment is configured as a so-called embedded magnet type rotor.

In the motor 1 configured as described above, the rotor 4 rotates due to the magnetic attraction and repulsion forces produced between the magnetic field formed by supplying drive electric power to the coils 15, and the magnetic fluxes of the permanent magnets 24.

Figure 2:
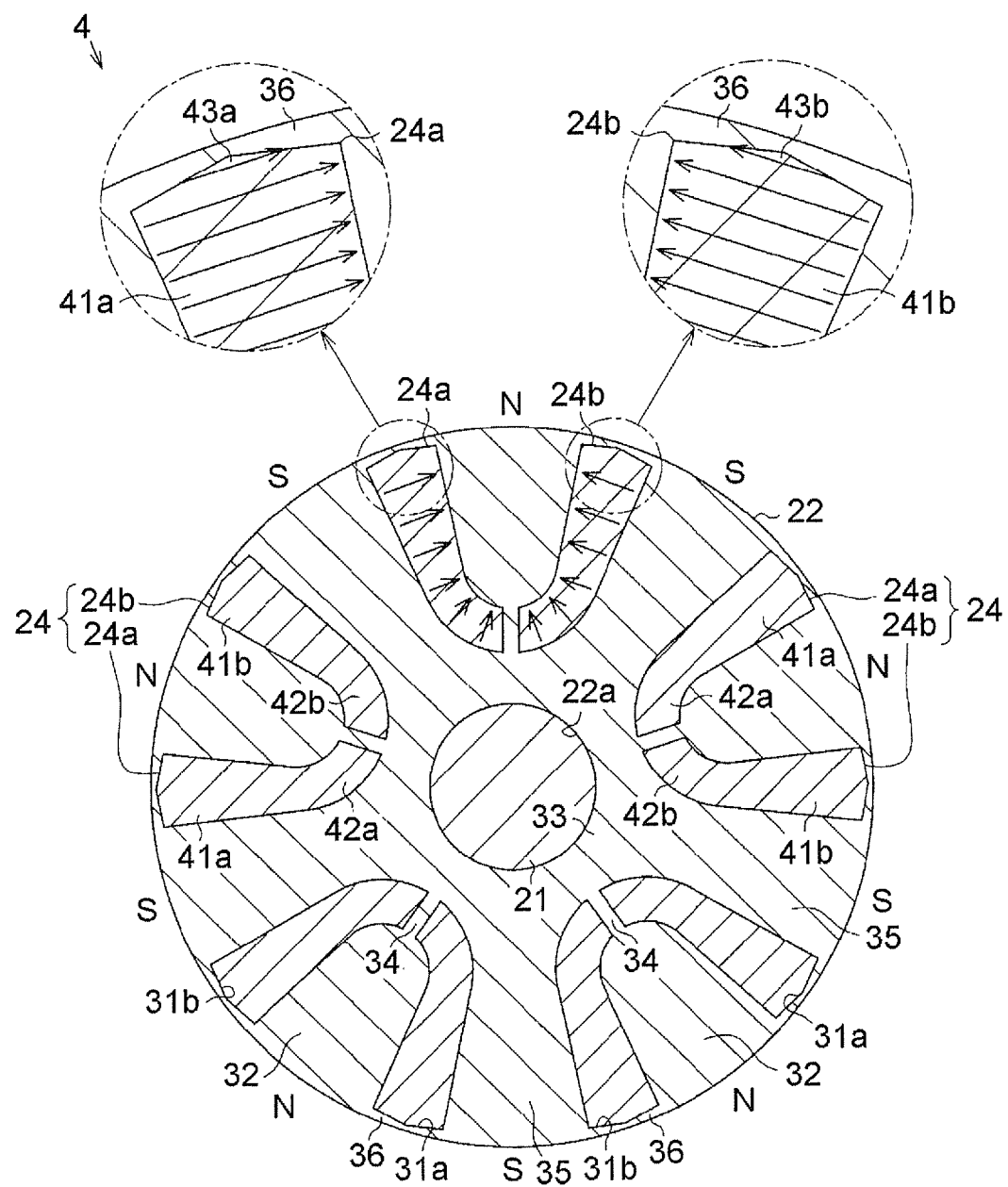
FIG. 2 is a sectional view of a rotor in accordance with the first embodiment.

Next, the structure of the rotor will be described. As shown in FIG. 2, the rotor core 22 is made of a soft magnetic material, such as iron or electromagnetic steel sheets or the like, and is formed in a generally columnar shape with an insertion hole 22a into which the rotating shaft 21 is inserted. The rotor core 22 has a plurality of cavities 31a and 31b within which the magnet pieces 24a and 24b are disposed, respectively. In this embodiment, each of the cavities 31a and 31b is formed in the shape of a hole whose sectional shape is substantially the same as the sectional shape of a corresponding one of the magnet pieces 24a and 24b. Furthermore, each inter-magnet-piece portion 32 of the rotor core 22, which is sandwiched between the magnet pieces 24a and 24b, is connected to a core portion 33 of the rotor core 22, which is fitted to the rotating shaft 21, via a first connecting portion 34 as a connecting portion. Furthermore, the inter-magnet-piece portions 32 are also connected to radially outer end portions of inter-magnet portions 35 of the rotor core 22, via second connecting portions 36. Each of the inter-magnet portions 35 is sandwiched between the adjacent permanent magnets 24. Each first connecting portion 34 is formed in a generally rectangular plate shape that radially extends, and each second connecting portion 36 is formed in a generally rectangular plate shape that circumferentially extends.

The magnet piece 24a and the magnet piece 24b are symmetric to each other about a straight line extending in a radial direction of the rotor 4. Specifically, the magnet piece 24a has a magnetic pole-facing portion 41a with a flat plate shape, which radially extends, and a proximity portion 42a that extends from a radially inner end portion of the magnetic pole-facing portion 41a toward the adjacent magnet piece 24b. Similarly, the magnet piece 24b has a magnetic pole-facing portion 41b with a flat plate shape, which extends in the radial direction of the rotor 4, and a proximity portion 42b that extends from a radially inner end portion of the magnetic pole-facing portion 41b toward the adjacent magnet piece 24a. In this embodiment, each of the proximity portions 42a and 42b has an arc curved plate shape such that the proximity portions 42a and 42b approach each other toward a radially inner side. Due to this arrangement, each permanent magnet 24 is formed in a generally arc shape that protrudes toward the rotating shaft 21-side (the radially inner side).

The magnetic pole-facing portions 41a and 41b are magnetized so that the poles of one of the two polarities (the N poles in this embodiment) in the magnetic pole-facing portions 41a and 41b in each permanent magnet 24 face each other in the circumferential direction and so that the poles of the other polarity (the S poles in this embodiment) in the magnet pieces 24a and 24b of adjacent permanent magnets 24 face each other in the circumferential direction. Then, on an outer peripheral surface of the rotor core 22, the magnetic poles (rotor magnetic poles) of the one polarity are formed at positions corresponding to the inter-magnet-piece portions 32, and the magnetic poles of the other polarity are formed at positions corresponding to the inter-magnet portions 35. That is, the inter-magnet-piece portions 32 and the inter-magnet portions 35 serve as magnetic paths for the magnetic fluxes of the magnet pieces 24a and 24b passing through the outer peripheral surface of the rotor core 22. Furthermore, the proximity portions 42a and 42b are magnetized so that a side of each proximity portion that is close to or in contact with the inter-magnet-piece portion 32 of the rotor core 22 (an inter-magnet-piece portion 32-side of each proximity portion) has the same polarity as the polarity of the inter-magnet-piece portion 32-side of each of the magnetic pole-facing portions 41a and 41b. Specifically, the magnetic pole-facing portions 41a and 41b are magnetized so that the magnetization direction of each magnetic pole-facing portion substantially follows or coincides with the circumferential direction of the rotor 4, and the proximity portions 42a and 42b are magnetized so that the magnetization direction of each proximity portion gradually changes from the circumferential direction to the radial direction toward the distal end of the proximity portion (the radially inner end portion of the proximity portion). In other words, each of the magnet pieces 24a and 24b is magnetized in a direction that substantially coincides with the direction of its plate thickness. The permanent magnets 24 used in the embodiment are bond magnets (plastic magnets, rubber magnets, or the like), and the permanent magnets 24 are magnetized after being disposed in the cavities 31a and 31b. Furthermore, in FIG. 2, the magnetization directions of the permanent magnet 24 disposed at an upper location are schematically indicated by arrows.

Each of the magnetic pole-facing portions 41a and 41b is configured so that the magnetic resistance in the magnetization direction is greater in a radially outer portion than in a radially inner portion. Concretely, the magnet pieces 24a and 24b are formed so that the length (thickness) of each of the magnet pieces 24a and 24b in the magnetization direction gradually increases from the distal end portion of the proximity portion 42a or 42b to the radially outer end portion of the magnetic pole-facing portion 41a or 41b. That is, the magnetic pole-facing portions 41a and 41b are formed so that the length of each magnetic pole-facing portion in the magnetization direction is greater in a radially outer portion of the magnetic pole-facing portion than in a radially inner portion thereof. Furthermore, the bond magnets used as the permanent magnets 24 (the magnet pieces 24a and 24b) are formed by homogeneously mixing magnet powder into a resin material so that the magnetic resistance per unit length is constant. Therefore, the magnetic resistance of each magnet piece 24a or 24b gradually increases from the distal end of the proximity portion 42a or 42b to the radially outer end portion of the magnetic pole-facing portion 41a or 41b, and the magnetic resistance in the magnetization direction is greater in a radially outer portion of the magnetic pole-facing portion 41a or 41b than in a radially inner portion thereof.

Furthermore, as shown in enlarged views in FIG. 2, a protruding portion 43a or 43b is provided at the radially outer end portion of each of the magnetic pole-facing portions 41a and 41b. The protruding portion 43a or 43b protrudes in a direction orthogonal to the magnetization direction of the magnetic pole-facing portion 41a or 41b (i.e., protrudes in the radial direction). Each of the protruding portions 43a and 43b has a taper shape whose length in the circumferential direction gradually decreases toward a radially outer side. The protruding portion 43a or 43b is magnetized in the direction that is the same as the magnetization direction of the magnetic pole-facing portion 41a or 41b, that is, magnetized in the circumferential direction of the rotor 4.

Next, operation of the rotor of the embodiment will be described. It is to be noted herein that the permanent magnets 24 of the rotor 4 may be subjected to a strong external magnetic field whose direction is opposite to the magnetization direction of the permanent magnets 24, for example, in the case where the coils 15 of the stator 3 are supplied with overcurrent. In the configuration in which each permanent magnet 24 has magnetic pole-facing portions 41a and 41b that radially extend as in the embodiment, radially outer portions of the magnetic pole-facing portions 41*a* and 41*b* are likely to be magnetized in the opposite direction by the external magnetic field and therefore demagnetization (irreversible demagnetization) is likely to occur. In this regard, in the embodiment, since the magnetic resistance of the radially outer portion of each of the magnetic pole-facing portions 41*a* and 41*b* in the magnetization direction is made large, magnetic fluxes are less likely to pass through the radially outer portions, and therefore it is possible to suppress demagnetization of the radially outer portions of the magnetic pole-facing portions 41*a* and 41*b* due to an external magnetic field.

Furthermore, in the rotor 4 of the embodiment, the distance from the outer peripheral surface of the rotor core 22 to the radially outer portions of the magnet pieces 24*a* and 24*b* is shorter than the distance from the outer peripheral surface to the radially inner portions of the magnet pieces 24*a* and 24*b*. Therefore, in a configuration where the magnetic resistance of each of the magnet pieces 24*a* and 24*b* in the magnetization direction thereof is constant in the radial direction, if the magnet pieces 24*a* and 24*b* are magnetized after being disposed in the cavities 31*a* and 31*b* of the rotor core 22, the proximity portions 42*a* and 42*b* of the magnet pieces 24*a* and 24*b* are not easily magnetized and the residual magnetic flux density of the magnet pieces 24*a* and 24*b* is likely to be non-uniform. In this regard, in this embodiment, the magnetic resistance of the magnet pieces 24*a* and 24*b* gradually increases from the distal end portions of the proximity portions 42*a* and 42*b* to the radially outer end portions of the magnetic pole-facing portions 41*a* and 41*b*, respectively, and this configuration reduces the difference in magnetic resistance among magnetic paths that pass through the radially outer portions of the magnetic pole-facing portions 41*a* and 41*b*, magnetic paths that pass through the radially inner portions of the magnetic pole-facing portions 41*a* and 41*b* and magnetic paths that pass through the proximity portions 42*a* and 42*b*. Therefore, even if the permanent magnets 24 are magnetized after being disposed in the cavities 31*a* and 31*b* of the rotor core 22, occurrence of non-uniformity in the residual magnetic flux density of the permanent magnets 24 can be suppressed.

As described above, according to the embodiment, the following advantageous effects can be achieved.

(1) By configuring the pair of magnetic pole-facing portions 41*a* and 41*b* so that the magnetic resistance of each magnetic pole-facing portion in the magnetization direction is greater in the radially outer portion than in the radially inner portion, the magnetic flux produced by an external magnetic field does not easily pass through the radially outer portion of each of the magnetic pole-facing portions 41*a* and 41*b*. Therefore, demagnetization of the radially outer portions can be suppressed. Accordingly, it is possible to, for example, suppress reduction in the output of the motor 1. Furthermore, since the difference in magnetic resistance among the magnetic paths that pass through various portions of each permanent magnet 24 is made small, occurrence of non-uniformity in the residual magnetic flux density can be suppressed even if the permanent magnets 24 are magnetized after being disposed in the cavities 31*a* and 31*b* of the rotor core 22.

(2) The magnetic resistance of each of the pair of magnetic pole-facing portions 41*a* and 41*b* is changed by forming the magnetic pole-facing portions 41*a* and 41*b* so that the length of each magnetic pole-facing portion in the magnetization direction is greater in the radially outer portion than in the radially inner portion. Therefore, it is easy to make the magnetic resistance of each of the magnetic pole-facing portions 41*a* and 41*b* in the magnetization direction greater in the radially outer portion than in the radially inner portion, in comparison with, for example, the case where the magnetic resistance is changed by using different materials (different kinds of materials) of the permanent magnets 24 for the radially outer portions of the magnetic pole-facing portions 41*a* and 41*b* and for the radially inner portions of the magnetic pole-facing portions 41*a* and 41*b*.

(3) Since the first connecting portions 34 are provided in the rotor core 22 and each of the first connecting portions 34 connects a corresponding one of the inter-magnet-piece portions 32 to the core portion 33, it is possible to increase the strength of the rotor core 22 and prevent the rotor core 22 from being damaged by centrifugal force caused by rotation of the rotor 4.

(4) The proximity portions 42*a* and 42*b* are provided in the pair of the magnet pieces 24*a* and 24*b*, respectively, and the proximity portions 42*a* and 42*b* extend from the radially inner end portions of the magnetic pole-facing portions 41*a* and 41*b* in such directions that the proximity portions 42*a* and 42*b* approach each other. The proximity portions 42*a* and 42*b* are magnetized so that the inter-magnet-piece portion 32-side of each proximity portion 42*a* or 42*b* has the same polarity as the polarity of the inter-magnet-piece portion 32-side of the magnetic pole-facing portion 41*a* or 41*b*.

It is to be noted herein that if the interval between the radially inner portions of the pair of the magnet pieces 24*a* and 24*b* is great, the magnetic flux that does not pass through the outer peripheral surface of the rotor core 22 (the magnet flux that does not contribute to magnet torque) increases, and therefore it is desirable to have a small interval between the radially inner portions of the magnet pieces 24*a* and 24*b*. However, if the interval between the radially inner portions of the pair of the magnet pieces 24*a* and 24*b* is reduced in a configuration in which, for example, each of the pair of the magnet pieces 24*a* and 24*b* has a flat plate shape (see FIG. 5), the diameter of the rotating shaft 21 needs to be made smaller, which leads to reduction in strength. In this regard, in the embodiment, since the proximity portions 42*a* and 42*b* are provided in the pair of the magnet pieces 24*a* and 24*b*, respectively, it is possible to reduce the magnetic flux that does not pass through the outer peripheral surface of the rotor core 22 while securing a sufficient strength of the rotating shaft 21.

(5) The protruding portions 43*a* and 43*b* are provided at the radially outer end portions of the pair of the magnetic pole-facing portions 41*a* and 41*b*, respectively, and each of the protruding portions 43*a* and 43*b* protrudes in a direction orthogonal to the magnetization direction of the magnetic pole-facing portion and is magnetized in the same direction as the magnetization direction.

Figure 3:
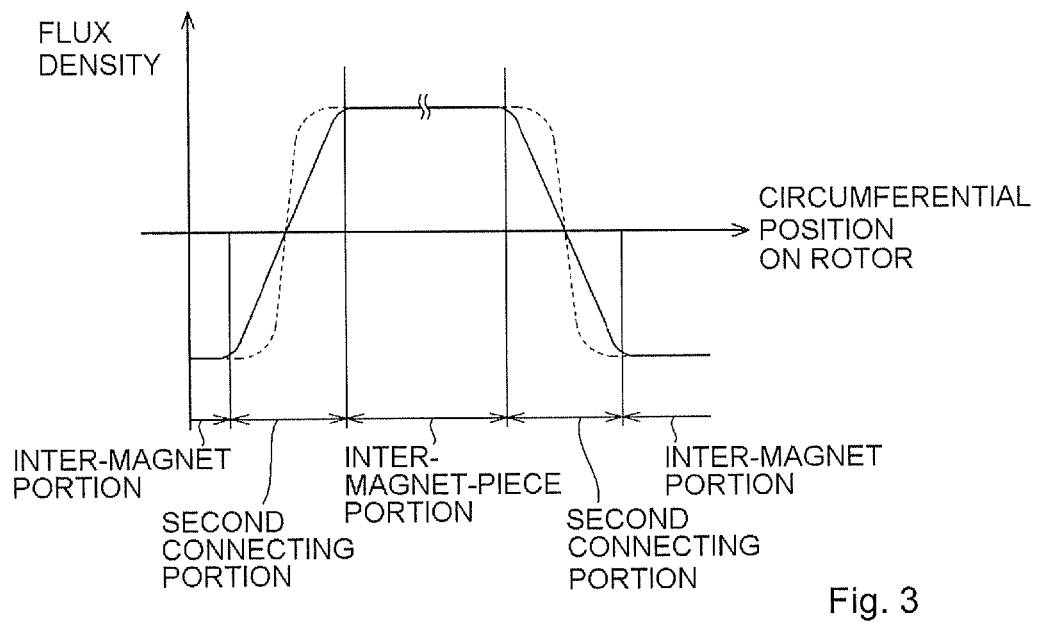
FIG. 3 is a graph showing a relationship between the position of the rotor core in a circumferential direction and the magnetic flux density.

In a case where each of the radially outer end portions of the magnetic pole-facing portions 41*a* and 41*b* is formed in a flat surface shape extending in parallel with the magnetization direction, there is substantially no magnetic flux going into and out from the radially outer end portions formed in the flat surface shape. Therefore, as shown by an interrupted line in FIG. 3, the magnetic flux density in the circumferential direction at the outer peripheral surface of the rotor core 22 sharply changes in the vicinity of positions (the second connecting portions 36) that face the magnetic pole-facing portions 41*a* and 41*b* in the radial direction. In this regard, in the foregoing configuration of the embodiment, since the magnetic flux produced by the protruding portions 43*a* and 43*b* goes into or out from the second connecting portions 36, the change in the magnetic flux density in the circumferential direction at the outer peripheral surface of the rotor core 22 is gradual as shown by a solid line in FIG. 3. Therefore, it is possible to, for example, reduce the torque ripple.

Next, a second embodiment of the invention will be described. For the sake of convenience in description, the same configurations as those of the first embodiment will be denoted by the same reference characters, and the description thereof will be omitted.

Figure 4:
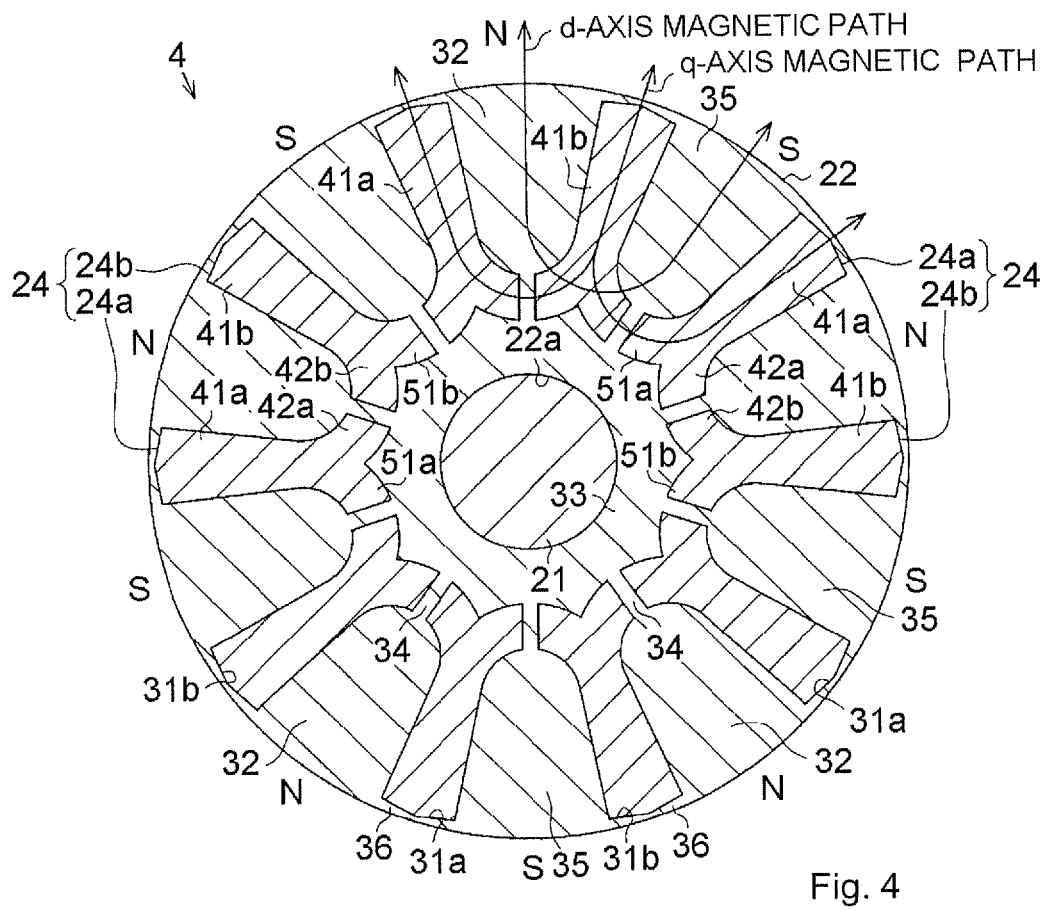
FIG. 4 is a sectional view of a rotor in accordance with a second embodiment of the invention.

As shown in FIG. 4, in each permanent magnet 24, extension portions 51a and 51b extend from radially inner end portions of a pair of magnetic pole-facing portions 41a and 41b toward the adjacent permanent magnets 24. The extension portions 51a and 51b are formed at positions facing the proximity portions 42a and 42b, respectively, in the circumferential direction, and each of the extension portions 51a and 51b is formed in an arc curved plate shape that gradually approaches the adjacent permanent magnet 24 toward a radially inner side.

It is to be noted herein that, as shown in FIG. 4, magnetic paths (d-axis magnetic paths) for magnetic fluxes (d-axis magnetic fluxes) produced by the permanent magnets 24 have routes that pass through inter-magnet-piece portions 32 of the rotor core 22 and the inter-magnet portions 35 of the rotor core 22. On the other hand, a magnetic path (q-axis magnetic path) for magnetic fluxes (q-axis magnetic fluxes) of each permanent magnet 24 shifted in direction by an electrical angle of 90 degrees from the d-axis magnetic fluxes has two routes, that is, a first route that passes through the pair of the magnetic pole-facing portions 41a and 41b and a second route that passes through one of the magnetic pole-facing portions 41a and 41b of the permanent magnet 24 and the other one of the magnetic pole-facing portions 41a and 41b of the adjacent permanent magnet 24. Since the magnetic resistance of each magnet is sufficiently higher than that of the rotor core 22 made of a magnetic material, the magnetic resistance of the first route is made high by the proximity portions 42a and 42b and the magnetic resistance of the second route is made high by the extension portions 51a and 51b. That is, in this embodiment, the extension portions 51a and 51b correspond to high-magnetic resistance portions.

As described above, according to this embodiment, the following advantageous effect can be achieved as well as the aforementioned advantageous effects (1) to (5) of the first embodiment. (6) Since the magnetic resistance of the second routes of the q-axis magnetic paths is increased and the q-axis inductance is decreased by providing the magnet pieces 24a and 24b with the extension portions 51a and 51b, the salient-pole ratio, which is the ratio between the d-axis inductance and the q-axis inductance, becomes large, and therefore, the reluctance torque can be increased. Furthermore, in the rotor 4 of this embodiment, since the magnetic resistance of the first routes is high due to the proximity portions 42a and 42b, the magnetic resistances of the routes of the q-axis magnetic paths are increased by providing the extension portions 51a and 51b. Therefore, the reluctance torque can be effectively increased.

Figure 5:
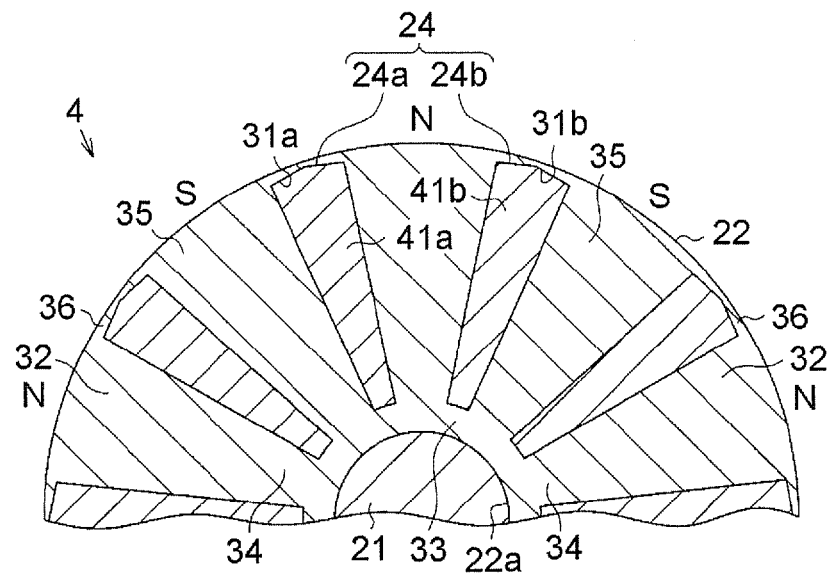
FIG. 5 is a sectional view of a rotor in accordance with another embodiment.

The foregoing embodiments may be carried out in the following forms that are appropriately modified from the embodiments. For example, although in the first embodiment, the proximity portions 42a and 42b are provided in the magnet pieces 24a and 24b respectively, this is not restrictive. For example, as shown in FIG. 5, the magnet pieces 24a and 24b may be configured to include only the magnetic pole-facing portions 41a and 41b, respectively.

Figure 6:
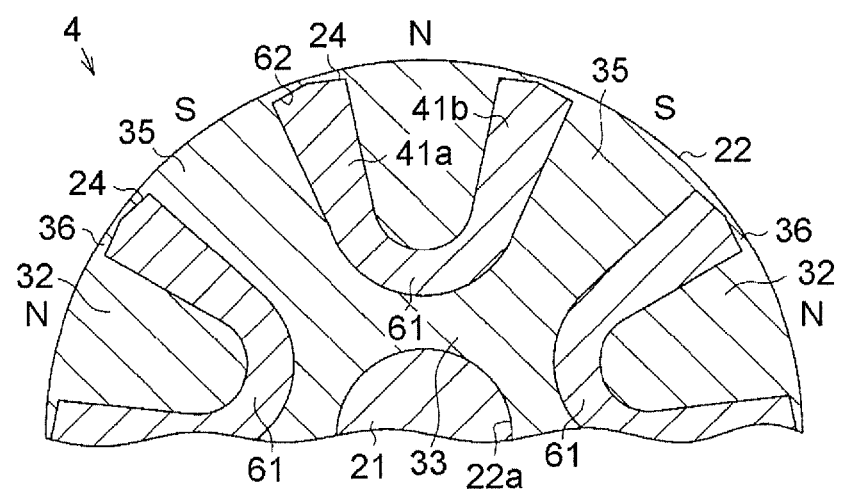
FIG. 6 is a sectional view of a rotor in accordance with another embodiment.

Although in the first embodiment, each permanent magnet 24 is formed of a pair of magnet pieces 24a and 24b, this is not restrictive. For example, as shown in FIG. 6, each permanent magnet 24 may be formed of a U-shaped single-body magnet that has magnetic pole-facing portions 41a and 41b and an inner side portion 61 that connects the radially inner end portions of the magnetic pole-facing portions 41a and 41b to each other. In the configuration shown in FIG. 6, each of the cavities 62 is formed in the shape of a hole whose sectional shape is substantially the same as that of the permanent magnet 24. Furthermore, each permanent magnet 24 may be formed in a V shape. In short, the shape of each permanent magnet 24 can be changed as appropriate as long as the shape has magnetic pole-facing portions 41a and 41b that radially extend. Similarly, in the second embodiment, each permanent magnet 24 may be formed of a single-body magnet. In this case, the rotor core 22 does not have the first connecting portions 34.

Figure 7:
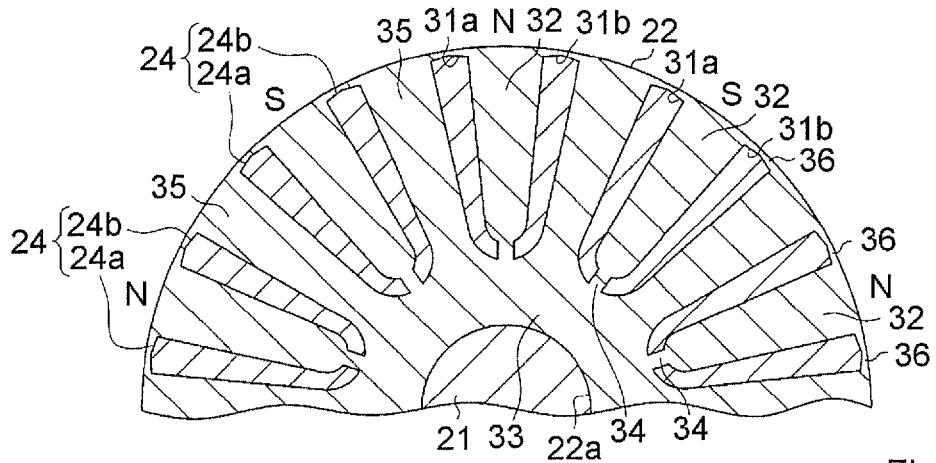
FIG. 7 is a sectional view of a rotor in accordance with another embodiment.

In the first embodiment, as shown in FIG. 7, permanent magnets 24 each of which has a pair of magnetic pole-facing portions 41a and 41b magnetized so that the poles of one of the two polarities face each other, and permanent magnets 24 each of which has a pair of magnetic pole-facing portions 41a and 41b magnetized so that the poles of the other polarity face each other may be alternately arranged in the circumferential direction. Similarly, in the second embodiment, permanent magnets 24 each of which has a pair of magnetic pole-facing portions 41a and 41b magnetized so that the poles of one of the two polarities face each other, and permanent magnets 24 each of which has a pair of magnetic pole-facing portions 41a and 41b magnetized so that the poles of the other polarity face each other may be alternately arranged in the circumferential direction.

Figure 8:
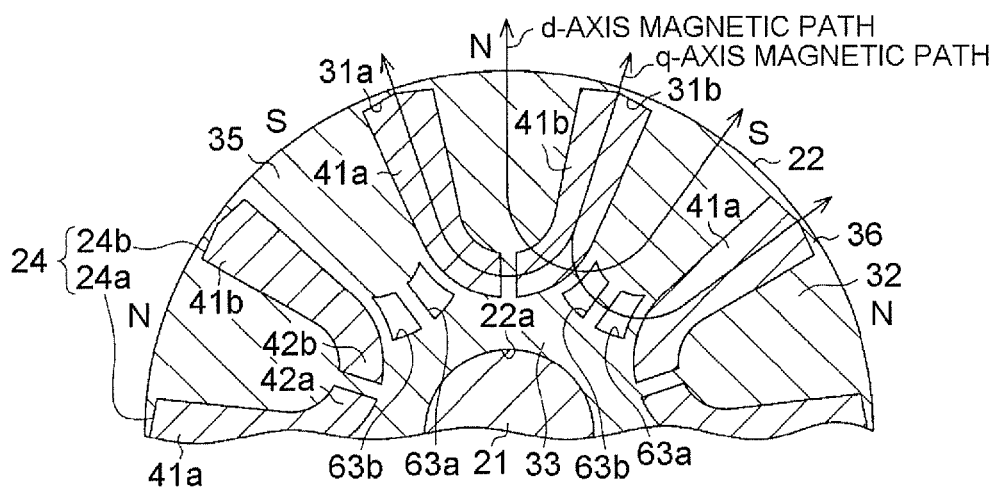
FIG. 8 is a sectional view of a rotor in accordance with another embodiment.

Although in the second embodiment, high-magnetic resistance portions are constituted by the extension portions 51a and 51b formed on the magnet pieces 24a and 24b, respectively, this is not restrictive. For example, as shown in FIG. 8, hollows 63a and 63b may be formed in each inter-magnet portion 35 of the rotor core 22 so that the hollows 63a and 63b function as high-magnetic resistance portions.

In the foregoing embodiments, the length of the distal end portion of each of the proximity portions 42a and 42b in the magnetization direction may be longer than the length of the radially outer end portion of each of the magnetic pole-facing portions 41a and 41b in the magnetization direction.

Figure 9:
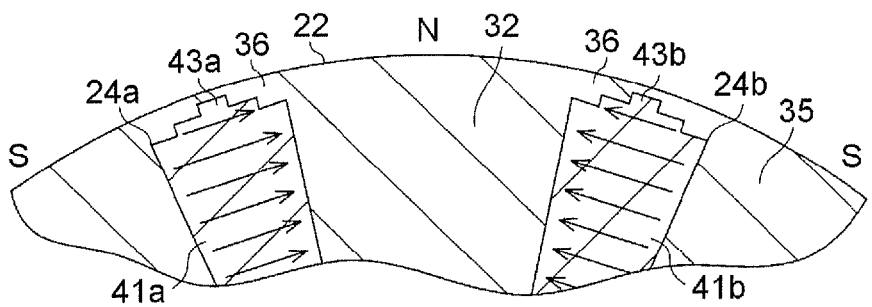
FIG. 9 is a sectional view of a rotor in accordance with another embodiment.

Although in the foregoing embodiments, each of the protruding portions 43a and 43b has a taper shape, this is not restrictive. The shape of each of the protruding portions 43a and 43b may be changed as appropriate. For example, as shown in FIG. 9, each of the protruding portions 43a and 43b may be formed in a stepped shape whose length in the circumferential direction decreases stepwise toward the radially outer side. Furthermore, the magnet pieces 24a and 24b may be provided without the protruding portions 43a and 43b, and each of the radially outer end surfaces of the magnetic pole-facing portions 41a and 41b may be formed to be a flat surface extending in parallel with the magnetization direction.

In the foregoing embodiments, the magnetic resistance of each of the magnetic pole-facing portions 41a and 41b in the magnetization direction is made greater in a radially outer portion than in a radially inner portion by changing the shape of the magnetic pole-facing portions 41a and 41b. However, this is not restrictive. The magnetic resistance of each of the magnetic pole-facing portions 41a and 41b in the magnetization direction may be made greater in a radially outer portion than in a radially inner portion by, for example, forming the radially outer portions of the magnetic pole-facing portions 41a and 41b by magnets with high magnetic resistance (e.g., ferrite magnets) and forming the radially inner portions thereof by magnets (e.g., samarium-cobalt magnets) with magnetic resistance that is lower than the magnetic resistance of the magnets of the radially outer portions.

Although in the foregoing embodiments, bond magnets are used as the permanent magnets 24, this is not restrictive. For example, sintered magnets or the like may be used.

Although in the foregoing embodiments, the permanent magnets 24 are magnetized after being disposed in the cavities 31a and 31b, the permanent magnets 24 that have been magnetized may be disposed in the cavities 31a and 31b.

Although in the foregoing embodiments, the invention is embodied in the motor 1 for use as a drive source for an electric power steering device or the like, this is not restrictive, that is, the invention may be used as a drive source for other devices, or may be used as an electric generator.

What is claimed is:

1. A rotor comprising:
   a rotor core fixed to a rotating shaft so as to be rotatable together with the rotating shaft; and
   a plurality of permanent magnets embedded and fixed in the rotor core,
   wherein each of the permanent magnets comprises:
   a pair of magnetic pole-facing portions radially extending and magnetized so that poles of the same polarity face each other in a circumferential direction,
   a pair of magnet pieces facing each other with an interval therebetween in the circumferential direction, and having proximity portions and the magnetic pole-facing portions, the proximity portions having an arc curved plate shape and the magnetic pole-facing portions having a flat plate shape, and
   a protruding portion provided at a radially outer end portion of each of the pair of the magnetic pole-facing portions, the protruding portion protruding in a direction orthogonal to the magnetization direction of the magnetic pole-facing portion, and being magnetized in a direction that is the same as the magnetization direction, wherein
   the protruding portion is formed in a stepped shape having a length in the circumferential direction that decreases stepwise toward the radially outer end portion of each of the pair of magnetic pole-facing portions,
   each of the magnetic pole-facing portions and each of the proximity portions is provided in each magnetic piece, respectively, and the proximity portions extend from radially inner end portions of the magnetic pole-facing portions in such directions that the proximity portions approach each other,
   a magnetic resistance of each of the pair of the magnetic pole-facing portions in a magnetization direction is greater in a radially outer portion than in a radially inner portion radially inner portion, wherein connecting portions are provided in the rotor core, and each of the connecting portions connects a corresponding one of inter-magnet-piece portions of the rotor core to a core portion of the rotor core, each of the inter-magnet-piece portions being sandwiched by the pair of the magnet pieces and serving as a magnetic path for the magnet pieces, and the core portion being fitted to the rotating shaft; and wherein
   a plurality of hollows is formed between adjacent magnet pieces of the pair of magnet pieces in each of the inter-magnet-piece portions sandwiched by the pair of the magnet pieces.

2. The rotor according to claim 1, wherein
   the pair of the magnetic pole-facing portions is formed so that length of each of the magnetic pole-facing portions in the magnetization direction is greater in the radially outer portion than in the radially inner portion.

3. The rotor according to claim 1, wherein:
   the proximity portions of the pair of the magnet pieces are magnetized so that an inter-magnet-piece portion-side of each of the proximity portions has the same polarity as polarity of an inter-magnet-piece portion-side of the magnetic pole-facing portion.

4. The rotor according to claim 1, wherein:
   the magnetic pole-facing portions of each of the permanent magnets is magnetized so that poles of one of the polarities in the magnetic pole-facing portions of each of the permanent magnets face each other in the circumferential direction, and poles of another one of the polarities in the magnetic pole-facing portions of the adjacent permanent magnets face each other in the circumferential direction; and
   each of high-magnetic resistance portions with high magnetic resistance is provided at a position that faces the radially inner portion of the adjacent permanent magnet in the circumferential direction.

5. A motor comprising the rotor according to claim 1.

6. The rotor according to claim 1, wherein:
   each of the permanent magnets further comprises extension portions that extend from radially inner end portions of the pair of magnetic pole-facing portions toward adjacent permanent magnets.

7. The rotor according to claim 6, wherein:
   the extension portions are formed at positions facing the proximity portions, respectively, in the circumferential direction, and each of the extension portions is formed in an arc curved plate shape that gradually approaches the adjacent permanent magnets toward a radially inner side.

* * * * *